United States Patent Office 2,766,267
Patented Oct. 9, 1956

2,766,267

ORGANIC ACIDS FROM OXYGEN-BEARING ORGANIC COMPOUNDS

Philip Hill, Lansing, Ill., assignor to Standard Oil Company, Chicago, Ill., a corporation of Indiana No Drawing. Application June 29, 1955, Serial No. 518,995

13 Claims. (Cl. 260—413)

This invention relates to an improved process of preparing organic acids from oxygen-bearing organic compounds and refers particularly to the caustic oxidation of these organic compounds. This is a continuation-in-part of my application entitled "Preparation of Organic Acids," Serial No. 248,281, filed September 25, 1951.

The partial oxidation of oxygen-containing organic compounds by treating the same with the oxides and hydroxides of an alkali metal or an alkaline earth metal, and the consequent preparation of a salt of the corresponding organic acid, is known. Continual efforts have been made to improve the basic process because low yields and contamination of the product have been almost uniformly encountered. Development of hydrocarbon synthesis and the Oxo process provides large actual or potential sources of oxygenated compounds that are produced in mixtures comprising alcohols, aldehydes, aldols, esters and ethers as well as olefins and paraffins. None of the known processes for dehydrogenation of oxygen-containing compounds has been found suitable for the preparation of organic acids from these sources. For example, the air-blowing oxidation process is ineffective to oxidize alcohols or aldehydes in the presence of olefins, and these latter compounds are almost always present in synthesis products.

A primary object, therefore, of this invention is the provision of an improved process for the preparation of organic acids from oxygenated compounds that are the product of the synthesis of normally liquid organic compounds from reactants including hydrogen and carbon monoxide. Another object of the invention is the provision of an improved process for the preparation of organic acids from at least one compound selected from the group consisting of alcohols, aldehydes, aldols, esters and ethers. A further object of the invention is the provision of a process for the preparation of organic acids from oxygen-containing organic compounds in the presence of feed-contaminating compounds such, for example, as olefinic hydrocarbons. Yet another object of the invention is the provision of a process that is equally well adapted to the oxidation of oxygen-containing compounds of varying composition. The invention has for other objects such other advantages or results as will be found to obtain in the specification or in the claims hereinafter made.

In the conventional caustic oxidation of oxygen-containing organic compounds a yield of about twenty-five percent is not considered unusual, many side reactions including polymerization, a degradation of the oxygen-containing molecule effected by the caustic treatment, and a failure to intimately contact the reactants so as to extract all of the available organic acid from a feed stock, being at least predominant causes for this low yield. Even though some of these losses may be counteracted by some known improvement, such, for example, as the addition of a ketone which acts as a promoter of the oxidation of alcohols, no known improvement avoids all of the above mentioned side reactions sufficiently to provide even approximately quantitative yields and no single process is adaptable to the oxidation of feed stocks which may contain varying amounts of different organic oxygen-bearing compounds.

I have found that the aforementioned objects can be accomplished and the hitherto existing disadvantages be avoided by preheating a slurry of an alkaline reacting compound selected from the group consisting of the oxides and hydroxides of alkali metals and alkaline earth metals in an inert oil to a temperature between about 175° to about 380° C. The slurry of oxides or hydroxides is intimately admixed with a feed stock of the types hereinafter described and comprising at least one oxygen-containing compound, and effecting reaction therebetween at a temperature within the said preheating range and at pressures between substantially atmospheric and 3000 pounds per square inch gauge, preferably in the presence of from about two to about eight percent of water by weight of caustic. The water can be derived from water introduced as associated water with caustic potash or it can be added to the reaction mixture, or preferably to the slurry before admixture with the feed stock. An efficient and preferred procedure for introducing water in preferred concentration into the reaction zone (and for maintaining the water therein, even though at high temperature and only atmospheric pressure, for a sufficient period to permit it favorably to affect the reaction) is the solution of the requisite amount of water in the feed stock and the introduction of the feed stock containing the dissolved water well into the reaction mass.

The present process is adaptable to mixtures containing more than one oxygen-bearing compound and is adapted to obtain maximum yields of organic acids from aldehydes or alcohols or mixtures thereof. For example, preheating the reactant caustic as a slurry in an inert oil avoids the aldol condensation of aldehydes by instantly establishing an elevated reaction temperature above about 175° C. The inert oil not only serves to retain lower-boiling feed stocks in solution when atmospheric pressure is employed but also reduces the tendency for product salt to decompose at the higher, more efficient reaction temperatures within the given range. The use of oil permits operation at relatively low contact times because of better heat distribution resulting from the presence of oil in the contact mass.

The presence of water within the said limits of about two to eight percent is also particularly effective in providing enhanced yields from mixtures of oxygen-containing compounds that include alcohols. Apparently the water increases yields, no matter from what oxygen-containing compound, by reducing the tendency of product salt to decompose, and at the higher reaction temperatures made suitable by the use of an inert solvent, as above noted, water in the prescribed limits does not inhibit the oxidation of any feed.

Examples of feed stocks that are especially suitable for the preparation of organic acids by the method of the present invention are as follows: feeds comprising at least one oxygen-containing compound selected from the group consisting of alcohols, aldehydes, esters, aldols and ethers; the water soluble or oil soluble fractions of hydrocarbon synthesis product that is usually produced by the hydrogenation of carbon monoxide over a promoted iron catalyst at temperatures between about 200° and 350° C. and at pressures between about 1 and 40 atmospheres, the said fractions being separated by known means and containing concentrated quantities of both aldehydes and alcohols, and usually in addition thereto esters, ketones and acids; the product of the Oxo process which comprehends the reaction of carbon monoxide and hydrogen with an olefin in the presence of catalysts including cobalt compounds in which the product, that is primarily aldehydic, is usually treated by steps including a subsequent hydrogenation to provide a product containing predominantly alcohols and also certain other above-mentioned oxygen containing compounds. The process of this invention is equally applicable to either the Oxo product containing predominantly aldehydes or the hydrogenated alcoholic product, because the novel procedure of preheating a slurry of alkali metal hydroxide in an inert oil permits such direct treatment of the aldehydes. The aldehydes and alcohols derived as products from the Oxo process are defined as mixtures of branched chain aldehydes and branched chain alcohols having a predominance of methyl branches.

Specific examples of alcohols which may be used as feed to my process are the normal straight-chain alcohols containing preferably from 8 to 13 carbon atoms per molecule, e. g., n-octyl alcohol, n-nonyl alcohol, n-decyl alcohol and lauryl alcohol. Branched chain alcohols are branched chain aldehydes also may be used as feed to the process. These include isooctyl alcohol, isooctyl aldehydes, isononyl alcohol, isononyl aldehyde, isodecyl alcohol, isodecyl aldehyde, isotridecyl alcohol and isotridecyl aldehyde. These isoalcohol and isoaldehyde products are produced by the formylation of olefins in the Oxo process and are known in the art as isoalcohols and isoaldehydes. They are characterized by having a predominance of methyl branching. The feed may consist of such mixed alcohols or the feed may be mixed aldehydes or mixtures of such aldehydes with such mixed alcohols or these may be mixed with minor amounts of esters, aldols and ethers which occur in minor amounts in the bottoms obtained from the Oxo product. Octyl alcohols, straight chain or branched chain, mixed with octyl aldehydes, straight chain or branched chain, may be used as feed. A mixture of isooctyl alcohol with isooctyl aldehyde obtained by the oxoation of $C_3=-C_4=$ codimer followed by fractionation may be used as feed to the process or such mixture may be hydrogenated to produce a product which upon fractionation gives a mixture consisting essentially of branched chain $C_8$ alcohols, i. e., isooctyl alcohol. Likewise, mixtures of the $C_9$, $C_{10}$, or $C_{13}$ isoalcohols with the $C_9$, $C_{10}$, or $C_{13}$ isoaldehydes respectively or mixtures of these with corresponding straight chain alcohols may be used as indicated above. The hydrogenated product of the aldehyde-alcohol Oxo product, consisting essentially of the corresponding isoalcohol, may be used as feed to the process. The hydrogenated product usually contains less than 5% aldehydes. The $C_9$ isoaldehydes and $C_9$ isoalcohols include the branched chain Oxo products of butylene codimer and/or the Oxo product of the dimer of isobutylene. The $C_{10}$ isoaldehydes and $C_{10}$ isoalcohols include the Oxo product of propylene trimer and the isotridecyl alcohols and the isotridecyl aldehyde feed to the process includes the Oxo product of propylene tetramer, the Oxo product of butylene cotrimer and the Oxo product of tri-isobutylene which products may be either primarily aldehydic or primarily alcoholic depending upon the extent to which the product has been subjected to hydrogenation prior to treatment with the heated suspension of caustic in the mineral oil medium. An example of an aromatic alcohol which may be used as feed is benzyl alcohol.

The amount of alkaline reagent is substantially the stoichiometric requirement to oxidize all of the oxygen-containing compounds to acids. Mol ratios, caustic to oxygen-containing organic compounds within the range of about 1:1 to about 1.5:1 are used. Slurries are flowable over a wide range of concentration. The slurries should consist of sufficient inert oil to coat the caustic and preferably should contain at least one part by volume of oil per volume of caustic. A concentration providing ease in handling while avoiding the handling of large volumes of inert oil can be readily selected by the operator.

The preferred alkaline reactants are the hydroxides of sodium and potassium; however, effective yields can be obtained from suspensions of hydroxides or oxides of the alkaline earth metals. The rarer metals are usually too expensive for use in such a process. The associated water content of potassium hydroxide, in commercial products about thirteen percent by weight, is strongly held and will be gradually liberated during reaction so as to provide an available water content between the two to eight percent limit prescribed by the invention and will effectively influence the reaction even though it is carried on at high temperatures and atmospheric pressure. The less expensive sodium hydroxide will produce equally high yields if water is introduced into the reaction zone preferably in solution in the feed. The amount of available or free water desirably present in the reaction mixture to effect optimum results falls within narrow limits and should be between about two percent and about eight to ten percent by weight of the employed alkaline reagent. A water content over about ten percent by weight will decrease the favorable effect and depress the reaction. When ten percent of water was added, a fifty percent yield of acid was obtained (in batch operation) in four hours; with three percent of water under substantially the same conditions, a ninety percent yield was obtained. A water content less than two percent will not provide maximum acid yields. For example, a ninety percent yield was obtained when 2.8 percent of water was present, whereas one percent of water, although providing some improvement over anhydrous reaction, provided only a sixty percent yield.

The temperature range utilized for the actual caustic oxidation reaction is generally between about 175° C. and about 380° C. When operating with a feed mixture consisting essentially of aldehydes or a feed mixture which is predominantly aldehyde and the remainder alcohol, it is preferred to carry out the oxidation reaction at a temperature between about 175° C. and about 260° C. until the aldehydes have been substantially converted. In order to complete the oxidation reaction, the temperature is preferably raised to a point between about 300° and about 380° C. When utilizing a feed consisting essentially of alcohols or a mixture containing only a minor amount of aldehydes, the reaction is usually carried out at a temperature between about 300° and about 380° C., preferably between about 350° and about 380° C. Hydrogenated product from the Oxo process usually contains less than about 5% aldehyde, the remainder consisting essentially of the alcohol having the same number of carbon atoms as the aldehyde with a minor amount of bottoms which may be removed by fractionation.

Prolonged reaction times at elevated temperatures results in decomposition of the soap product and a formation of carbonates. These prolonged contacting times are particularly obtained during batch-type operation. Carbonate formation appears to an appreciable extent at prolonged times at a temperature of about 300° C. and the amount of carbonate formation at a given contacting time increases with increase in temperature. When operating at temperatures above 300° C., particularly in the preferred alcohol oxidation temperature range of about 350° C. and about 380° C. it is preferred to utilize short contacting times such as are obtained by a continuous operation. In general, only slight decomposition is obtained when the contacting time at these elevated temperatures is maintained between about 5 minutes and 45 minutes. In general, the higher the temperature the shorter the maximum contacting time.

It is essential to rapidly establish at least the minium temperature of 175° C. to avoid aldol condensation when aldehydes are present in the feed stock. Introducing feed stock into a relatively large body of preheated slurry is a preferred means of rapidly heating the feed to the minimum reaction temperature. The introduction of feed stock to the lower portion of a large body of preheated caustic slurry as through a distributor or sparger, especially when operating at atmospheric pressure appears to provide maximum distribution of the water dissolved in the feed stock and maximum contact of feed stock with suspended caustic. Hydrogen is evolved during the reaction and feed stock is preferably added to the preheated caustic at a rate that will produce a steady evolution of the gas. Evolution of gases continues for some time after addition of feed stock is completed; agitation of the mixture and maintenance of the reaction temperature is preferably continued until gas evolution becomes negligible.

It is within the scope of the present invention to employ more than one contacting step in which feed stock is reacted with preheated caustic slurry.

The organic salt resulting from the above process is washed from the reaction mass with an aqueous solvent and the remaining oil phase is decanted from the aqueous solution. A light hydrocarbon solvent is used to wash residual oil from the aqueous solution. The hydrocarbon solvent can be separated by decanting or it can be flashed off the mixture. The alkali metal organic salt may be recovered as such or as a concentrated solution containing, if desired, free hydroxide for use as a commercial product. When the organic acid is the final product it is liberated from the salt solution by treatment with a mineral acid, and the liberated organic acid is thereafter decanted from the mixture. Purification steps such as air blowing, distillation, or an aqueous wash can then be employed.

Upon separation of the produced salt and the inert oil of the caustic slurry, a solution of both paraffins and olefins and traces of oxygen-containing compounds will sometimes be found in the inert oil. The olefinic hydrocarbons, for example, can be separated from the inert oil by fractional distillation, and it has also been found effective to treat these oils with additional quantities of preheated caustic slurry so as to remove the last traces of oxygen-containing organic compounds therefrom.

The following specific examples are provided for the purpose of illustrating the invention and of demonstrating the marked improvement in yield of product that is obtained by employing a preheated caustic and preferably effecting reaction in the presence of a small amount of water.

Example 1

In this example the unrefined product of the formylation stage of an Oxo process, in which the feed was a mixture of twelve-carbon-atom olefins, was oxidized to form product acid by slowly adding the Oxo product to a preheated suspension of an alkali.

This formylation product had the following compositions:

|  | Percent by weight |
|---|---|
| Tridecyl aldehyde | Between 10 and 25 |
| Tridecanol | Between 10 and 20 |
| Unreacted olefin | Between 45 and 75 |
| Bottoms product | Between 5 and 15 |

This unrefined product was slowly introduced into 0.5 mol of sodium hydroxide suspended in cetene that had been preheated to a temperature of 210° C. Addition of the said product was continued until 0.144 mol of the aldehyde, contained in the feed, was introduced. Hydrogen was liberated during the course of the reaction. Upon completion of this addition, the reaction mixture was stirred at the reaction temperature of 210° C. for a short time until gas evolution was negligible. The total contact time of caustic with the formylation product was one hour. A yield of 0.170 mol of tridecanoic acids was recovered from the reaction product by water washing, separating the formed soap solution from remaining oils, and springing the tridecanoic acids from the solution with a mineral acid. The unusually high yields obtained indicates that some oxidation of oxygen-containing products other than the aldehyde occurred even though a relatively low temperature and short reaction period were employed.

When the reaction temperature was lowered to 175° C. with contact time of 1.75 hours, the yield of acid obtained from a run otherwise substantially identical to the above example was reduced by more than fifty percent and the production of aldol condensation products was encountered. As the object of the present process is to provide improved yields of organic acids, it is clear that a lower limit of 175° C. is established although even at that temperature relatively substantial yields of acid are obtained.

Example 2

In this example an alkaline earth metal oxide was employed to effect the oxidation. The Oxo product of the same olefin mixture, a propylene tetramer, was employed, as in Example 1, and was fed to a suspension preheated to 215° C. and consisting of 0.5 mol of barium oxide suspended in cetene. Addition of feed stock was continued until feed stock containing 0.146 mol of aldehyde was introduced. Stirring was continued until gas evolution became negligible. The total reaction period was 2.75 hours. The product was treated as in Example 1 and 0.156 mol of tridecanoic acids were recovered. The unusually high yield again indicates that a substantial proportion of the alcohol or of the other constituents of the Oxo product was also oxidized to the acid even though again a low temperature was employed.

The tridecanoic acids produced by the above examples exhibited a boiling point range between 110° and 126° C. at a pressure of 0.3–0.4 mm. Hg, a refractive index ($n^{20}_D$) of 1.4470, a specific gravity ($d^{20}_4$) of 0.893, a neutralization equivalent of 215.6 and an acid concentration of 99.5 percent.

Example 3

A suspension of sodium hydroxide in cetene was heated to a temperature of between 200° and 215° C. A crude Oxo product that was obtained by the carbonylation of a dodecene and to which was added 0.20 mol of diisobutyl ketone, a known promoter, was slowly introduced into the preheated suspended caustic. The crude Oxo material contained 0.097 mol of tridecyl aldehyde, 0.027 mol of bottoms calculated as aldehyde, and a 0.096 mol of tridecanol, the total oxygenated compounds constituting 0.220 mol. Hydrogen was evolved steadily and rapidly during addition of the Oxo product to the caustic suspension. Gas continued to be evolved although at a slower rate after the addition of the feed was completed. A total of 0.178 mol of hydrogen was evolved during the reaction and 0.180 mol of sodium tridecanoate was obtained, representing a yield based on the alcohol and aldehyde of 93.2%.

The low reaction temperature, which was nevertheless effective owing at least in part to the added ketone, did not result in any notable loss to aldols because the feed was rapidly raised to the reaction temperature by introducing the feed into preheated caustic.

Example 4

Tridecyl alcohol was slowly introduced into a slurry of potassium hydroxide preheated in a neutral oil to a temperature between 260° and 270° C. The potassium hydroxide contained thirteen percent of water of association. The reaction was continued for five hours, during which time the potassium hydroxide decomposed in reacting with the alcohol and gradually liberated free or available water in the reaction mass. A yield of ninety percent by weight of tridecanoic acids was obtained.

Example 5

In this example the effect of employing the inert suspending medium is demonstrated. The product of an Oxo process employing octenes as feed olefins was distilled and a bottoms product which ordinarily constitutes between about five and fifteen percent by weight of the total Oxo product was obtained as a distillation residue. This bottoms product was treated with preheated solid sodium hydroxide at 200° C. in the absence of any inert oil. After hexane extraction and springing, a product consisting of a mixture of about fifty percent nonanoic acid and fifty percent higher boiling acids was obtained in only a twenty-eight percent yield.

When the same quantity of the bottoms fraction was treated at 275° C. with preheated caustic suspended in an inert paraffinic mineral oil having from fifteen to twenty-five carbon atoms per molecule, the yield of acids was increased to approximately sixty-five weight percent based on the weight of the total Oxo bottoms charged. This apparently represents substantially quantitative yield because no further amount of acids could be recovered by oxidation of the residual oil.

Oxo bottoms fractions contain higher boiling condensates of the primary alcoholic and aldehydic product and comprise such oxygenated compounds as aldols, ethers, and esters; the yield obtained in this example demonstrates the fact that oxygenated compounds of this type are also oxidizable by my process.

Example 6

In this example an aryl alcohol was oxidized to the corresponding acid. Benzyl alcohol was added to powdered potassium hydroxide that had been dispersed in an inert paraffinic mineral oil having from about fifteen to twenty-five carbon atoms per molecule and preheated to a temperature of 250° C. The alcohol was added slowly and the reactants were agitated for a period during which eighty percent of the theoretical amount of hydrogen was evolved. When evolution of hydrogen from the reaction mass ceased water was added to the mixture and sodium benzoate formed by the reaction was washed therefrom. Mineral oil was decanted from the aqueous phase. Mineral oil suspended in the aqueous phase was extracted with hexane. This aqueous phase was acidified with a mineral acid, benzoic acid was thereby liberated from aqueous solution and was separated therefrom. The acidified aqueous layer was washed with hexane to recover small quantities of the benzoic acid. A 73.6 percent yield of unrefined benzoic acid by weight based on the alcohol was recovered.

Example 7

A slurry consisting of 1.3 mols of sodium hydroxide suspended in 300 cc. of heavy white oil was heated in a stainless steel flask with agitation to a temperature between about 305° and 310° C. To this suspension there was added about 12.6 grams of sodium octanoate as a solutizer. Water was stirred with a mol of isooctyl alcohol until the alcohol contained about 2.8 volume percent of water. This alcohol was then introduced into the preheated slurry of caustic soda, and gas was evolved from the reaction mixture through a five-hour reaction period, 2.02 mols of gas being evolved. The reaction mixture was cooled to 150° C. and 500 cc. of water were added to dissolve out sodium octanoate and excess caustic soda. A yield of 0.915 mol, or 91.5 mol percent, of sodium octanoate was formed. Even though an elevated temperature was employed for the reaction, the protective effect of the inert oil and dissolved water was such that only five percent of sodium carbonate was produced.

Example 8

In this example an insufficient quantity of water was employed although all other conditions were maintained substantially equivalent to those of Example 7. A slurry of 1.95 mols of caustic soda in 200 cc. of heavy white oil was heated with agitation to a temperature between 305° and 310° C. and a small amount, 12.6 grams, of sodium octanoate was added as a solutizer. In this example 1.27 mols of isooctyl alcohol containing only one percent of water were added to the preheated suspension and 2.61 mols of gas were evolved from the reaction mixture over a 6.25-hour reaction period. A substantial quantity, 38.4 grams, of a low boiling hydrocarbon was distilled from the reaction mixture. The alcohol was introduced slowly throughout the reaction period and at the conclusion thereof the reaction mixture was cooled to about 150° C., whereupon 500 cc. of water were added to separate the salt and excess caustic soda. In this case only 0.76 mol, or 60.4 mol percent, of the sodium octanoate and a relatively high percentage, 33.9 mol percent of sodium carbonate was formed.

Example 9

In this example an attempt was made to effect reaction in the absence of the inert oil diluent.

Powdered sodium hydroxide in the amount of 2.84 mols was placed in a stainless steel flask and a small amount of octanoic acid (0.17 mol) was added thereto in order to form sodium octanoate as a solutizer. Water was added to the powdered caustic soda rather than by the preferred manner of introducing the water as a solute in the feed; sufficient water was added to amount of 3.6 weight percent based on the caustic. The caustic soda was then preheated to 280° C. Thereafter 1.6 mols of isooctyl alcohol, containing only about one volume percent of water, was slowly introduced into the caustic soda in the absence of an inert oil over a five-hour period, during which time 3.1 mols of gas were evolved. During the course of the reaction 87.2 grams of a low boiling hydrocarbon were distilled from the reaction mixture. After addition of the alcohol was completed the mixture was cooled to about 150° C. and 300 cc. of water were added with stirring to dissolve the sodium octanoate and other water-soluble materials. Titration of the aqueous alkaline solution so formed indicated a yield of only about fifty percent of sodium octanoate and of almost thirty percent of sodium carbonate.

Example 10

This example demonstrates the effectiveness of the process with respect to one of the heavier components of Oxo bottoms. An ether, nonylidene dinonyl ether, also termed nonyl aldehyde dinonyl acetal, was introduced into potassium hydroxide preheated to 270° C. and maintained in contact therewith for three and one half hours in the presence of about 150 weight percent of tridecyl alcohol so that the ether would be reacted with the caustic in an environment similar to that of Oxo bottoms. A sixty-five weight percent yield of nonanoic acid and a seventy-nine weight percent of tridecanoic acid were isolated. The reported yield of nonanoic acid by weight represents a theoretical yield of eighty-four percent from the ether based on the assumption that one mol of the ether reacts with two mols of potassium hydroxide to provide two mols of the potassium salt of nonanoic acid.

Having described my invention, I claim:

1. A process for the preparation of a salt of at least one oxygen-containing organic acid from at least one oxygen-containing compound reactant selected from the class consisting of aldehydes, alcohols, aldols, esters, ethers, and mixtures thereof comprising the steps of preheating a slurry of an alkaline reactant selected from the class consisting of alkali metal hydroxides and alkali metal oxides in an inert hydrocarbon oil to a temperature within the range of about 175° C. to about 380° C., maintaining said slurry within said temperature range while mixing therewith, the oxygen-containing compound reactant whereby hydrogen is liberated and a reaction mixture containing said hydrocarbon oil and at least one alkali metal salt of said oxygen-containing organic acid is produced and recovering said salt of the oxygen-containing organic acid from said reaction mixture.

2. The process of claim 1 wherein said alkali metal hydroxide is sodium hydroxide.

3. The process as described in claim 1 wherein the feed is an aliphatic alcohol and the slurry is a slurry of sodium hydroxide preheated to a temperature within the range of about 300° C. and 380° C. before contact with said alcohol and maintained within said temperature range during contact with said alcohol.

4. The process as described in claim 3 wherein the alcohol consists essentially of isooctyl alcohol product of the Oxo process.

5. A process for the preparation of at least one oxygen-containing aliphatic organic acid from at least one oxygen-containing aliphatic organic compound reactant selected from the class consisting of aldehydes, alcohols, and mixtures thereof comprising the steps of (1) preheating a slurry of an alkali metal hydroxide selected from the class consisting of sodium hydroxide and potassium hydroxide in an inert hydrocarbon oil to a temperature within the range of about 175° C. to about 380° C., (2) maintaining said slurry within said temperature range while mixing therewith said at least one oxygen-containing aliphatic organic compound reactant whereby a gas consisting essentially of hydrogen is liberated and a reaction mixture containing said hydrocarbon oil and containing at least one alkali metal salt of said at least one oxygen-containing aliphatic organic acid is produced, (3) maintaining the temperature of said reaction mixture within said range at least as long as substantial evolution of hydrogen continues from said reaction mixture, (4) washing the reaction mixture of step 3 with water to form a liquid phase consisting essentially of an aqueous solution containing the alkali metal salt of said at least one oxygen-containing aliphatic organic acid and unreacted alkali metal hydroxide and a supernatant liquid phase consisting essentially of said hydrocarbon oil, (5) contacting the aqueous solution of alkali metal salt of said oxygen-containing aliphatic organic acid of step 4 with an aqueous solution of a mineral acid, and (6) recovering said oxygen-containing aliphatic organic acid from step 5 of the process.

6. The process of claim 5 wherein the reaction occurs in the presence of from about 2% to about 8% by weight of water based on the weight of the alkali metal hydroxide.

7. The process of claim 5 wherein the oxygen-containing aliphatic organic compound consists essentially of alcohol and the reaction temperature is between about 350° C. and about 380° C.

8. The process of claim 5 wherein the oxygen-containing aliphatic organic compounds consists essentially of aldehyde and the reaction temperature is between about 175° C. and about 260° C.

9. A process for the preparation of at least one oxygen-containing organic acid from at least one oxygen-containing compound reactant selected from the class consisting of aldehydes, alcohols, aldols, esters, ethers, and mixtures thereof, comprising the steps of (1) preheating a slurry of an alkaline reactant selected from the class consisting of alkali metal hydroxides and alkali metal oxides, in an inert hydrocarbon oil to a temperature within the range or about 175° C. to about 380° C., (2) maintaining said slurry within said temperature range while mixing therewith, in the presence of about 2 to about 8 percent of water based on the weight of said alkali metal hydroxide slurried in step 1, said at least one oxygen-containing organic compound reactant, whereby a gas consisting essentially of hydrogen is liberated and a reaction mixture, containing said hydrocarbon oil and at least one alkali metal salt of said oxygen-containing organic acid, is produced, (3) maintaining the temperature of said reaction mixture within the said range at least as long as substantial evolution of hydrogen continues from said reaction mixture, (4) washing the reaction mixture of step 3 with water to form a two-phase liquid system consisting essentially of an aqueous solution containing the alkali metal salt of said organic acid and unreacted alkaline reactant and a supernatant liquid phase consisting essentially of said hydrocarbon oil, (5) separating the aqueous solution phase and hydrocarbon oil phase of step 4, (6) contacting the separated aqueous solution phase of step 5 with an aqueous solution of a mineral acid, and (7) recovering said oxygen-containing organic acid from step 6 of the process.

10. The process as described in claim 9 wherein the oxygen-containing organic compound reactant is a mixture of octyl alcohols with octyl aldehydes.

11. In a process for the production of oxygen-containing aliphatic organic acids by the caustic oxidation of Oxo process formylation product, the aliphatic oxygen-containing organic compounds of which comprise essentially alcohols and aldehydes, the improvement which comprises the steps of (1) preheating a slurry of an alkali metal hydroxide selected from the class consisting of potassium hydroxide and sodium hydroxide in an inert hydrocarbon oil to a temperature within the range of about 175° C. to about 380° C., (2) contacting the slurry of step 1 with said Oxo process formylation product in the presence of from about 2 to about 8 percent of water based on the weight of alkali metal hydroxide in said slurry of step 1 at a temperature within the range of about 175° C. to about 380° C. to form a reaction mixture containing the alkali metal salts of the oxygen-containing aliphatic organic acids containing the same number of carbon atoms per molecule as said oxygen-containing aliphatic organic compounds in said Oxo process formylation product, (3) extracting the alkali metal salt of the oxygen-containing aliphatic organic acid of step 2 from the reaction mixture of step 2 with water, (4) acidifying the aqueous solution of said alkali metal salt obtained in step 3 to convert the alkali metal salt to corresponding aliphatic organic acid, and (5) recovering the oxygen-containing aliphatic organic acid from the acidified solution of step 4 of the process.

12. The improvement as described in claim 11 wherein the alkali metal hydroxide is potassium hydroxide containing about 13 percent of strongly bound water, and wherein the water in the reaction mixture is maintained within the 2 and 8 percent limits by the gradual release to the reaction mixture of at least a part of said strongly bound water.

13. The improvement as described in claim 11 wherein at least a part of the water in said reaction mixture is provided as water dissolved in the oxygen-containing aliphatic organic compound contacted with the slurry of alkali metal hydroxide.

References Cited in the file of this patent

UNITED STATES PATENTS

| | | |
|---|---|---|
| 2,384,817 | Chitwood | Sept. 18, 1945 |
| 2,614,122 | Mikeska | Oct. 14, 1952 |
| 2,727,050 | Sutton | Dec. 13, 1955 |